US006658993B2

(12) United States Patent
Kuenen

(10) Patent No.: US 6,658,993 B2
(45) Date of Patent: Dec. 9, 2003

(54) OVEN WITH DRIP COLLECTION

(75) Inventor: Hendrikus Antonius Jacobus Kuenen, Overloon (NL)

(73) Assignee: CFS Bakel B.V., Bakel (NL)

( * ) Notice: Subject to any disclaimer, the term of this patent is extended or adjusted under 35 U.S.C. 154(b) by 0 days.

(21) Appl. No.: 10/113,571

(22) Filed: Apr. 2, 2002

(65) Prior Publication Data

US 2002/0162462 A1 Nov. 7, 2002

(30) Foreign Application Priority Data

Apr. 2, 2001 (NL) .............................. 1017755

(51) Int. Cl.[7] .............................. A23L 1/00; A23L 3/04; A47J 37/00; F24C 15/32; F24D 1/00
(52) U.S. Cl. .............................. 99/446; 99/386; 99/400; 99/443 C; 99/479
(58) Field of Search .......................... 99/352–355, 361, 99/362, 443 R, 443 C, 494, 476, 473, 477–479; 432/8, 142, 144, 152, 143, 145, 128, 133, 176, 199; 219/388, 401; 34/203, 201, 207, 208, 209, 216, 217, 224; 126/20, 21 A, 21 R; 198/778, 831, 952; 426/520, 521, 281, 312

(56) References Cited

U.S. PATENT DOCUMENTS

| 5,329,916 | A | * | 7/1994 | Lygum ................. 99/479 X |
| 5,702,245 | A | * | 12/1997 | London ................. 99/355 |
| 5,741,536 | A | * | 4/1998 | Mauer et al. ........... 99/476 X |
| 5,850,781 | A | * | 12/1998 | Kuenen ................. 99/443 C |
| 6,065,463 | A | * | 5/2000 | Martin ................. 99/386 X |
| 6,095,805 | A | * | 8/2000 | Kuenen ................. 99/478 X |
| 6,244,168 | B1 | * | 6/2001 | Van de Vorst et al. ... 99/443 C |
| 6,247,922 | B1 | * | 6/2001 | Kuenen ................. 99/443 C |
| 6,494,131 | B2 | * | 12/2002 | Van de Vorst et al. ... 99/443 C |

* cited by examiner

*Primary Examiner*—Timothy F. Simone
(74) *Attorney, Agent, or Firm*—Sughrue Mion, PLLC

(57) ABSTRACT

An oven including a housing, a heater for heating the interior space of the housing, and a conveyor belt which extends between an inlet and an outlet of the housing, for passing products which are to be heated through the interior space, which conveyor belt has at least one helical path with turns which are situated above one another and are supported by guides, which extend in a corresponding way to the turns and are supported by bearing arms transversely below the turns. A collector is also provided for the collection of liquids which may accumulate on the bearing arms and/or guides.

13 Claims, 3 Drawing Sheets

OVEN WITH DRIP COLLECTION

BACKGROUND OF THE INVENTION

1. Field of the Invention

The invention relates to an oven, comprising a housing, heating means for heating the interior space of the housing, and a conveyor belt which extends between an inlet and an outlet of the housing, for passing products which are to be heated through the interior space, which conveyor belt has at least one helical path with turns which are situated above one another and are supported by means of guides, which extend in a corresponding way to the turns and are supported by bearing arms transversely below the turns, and collection means for the collection of liquids.

SUMMARY OF THE INVENTION

2. Description of Related Art

An oven is disclosed in EP-A 558 151. This oven is suitable for heating food products. Examples which are mentioned include meat products, such as chicken, hamburgers, schnitzels, cordon bleus and the like. The food products can be treated in various ways depending on the nature of the product. The temperature and residence time in the oven may, for example, be set in such a manner that a certain crust formation or browning is obtained. The conditions in the oven may also be selected in such a manner that a certain degree of cooking is achieved. In the known oven, these two treatments can be combined as a result of there being two zones, which may have different heating conditions.

The products may be heated in various ways. According to a first possibility, the oven is heated by means of hot-air heating. The hot-air heating may operate with heat-transfer oil or may be of the electrical type. According to another possibility, the oven is heated by means of steam.

When the products are being heated, processes occur which lead to moisture and other vapours being released. These circulate through the oven and may be deposited on the fixed surfaces thereof. In certain situations, such as when heating marinated meat, deposits may form which then burn as a result of the prolonged heating in the oven. These deposits may adopt the shape of icicles on all kinds of parts of the interior of the oven.

The icicle-shaped deposits may in particular occur on the bearing means for the guides over which the conveyor belt slides. It is also possible for the moisture and fat which drip off the conveyor belt to accumulate on this bearing means.

The icicle shapes formed in this way consist to a large extent of the burnt products of carbonized meat and fat and the like. The problem which arises in this context is that these burnt products may pass onto the products located on the conveyor belt. This can be caused by moisture dripping down along the icicle shapes and entraining the burnt products. The drops which fall off the icicle shapes as a result form discoloured spots on the products, which are unacceptable.

The prior art oven is provided with a strip which extends underneath a part of the conveyor belt, which strip is provided with collection means for collecting liquids which originate from windings of the conveyor belt which are the higher level. In the prior art oven, this strip separates two areas positioned on top of each other which can be brought in a different heating state. A disadvantage of this prior art embodiment is that a strip of this kind has large dimensions, and influences the air flow within the oven.

The object of the invention is to provide an oven of the type described above which does not have this drawback. This object is achieved by the fact that the collection means have an elongated shape and extend according to their longitudinal direction transverse with respect to the turns for the collection of liquids which may accumulate on the bearing arms and/or guides.

Any deposits which adhere to the bearing means, such as icicle shapes, can no longer give rise to the formation of spots on the products, since the drops which drop off them are intercepted in good time by the collection means.

These collection means may be designed in various ways. According to a first option, the collection means may be in gutter or receptacle form. The liquids collected can also be discharged via the gutter-like collection means to outside the area where the products are located on the belt.

The gutter or receptacle shape of the collection means can be implemented in various ways. According to a first embodiment, the bearing arms themselves are designed in such a way that they are in the shape of a gutter. The fat and the like which drips off the conveyor belts can be successfully collected by means of gutter-like bearing arms of this type.

According to a further embodiment, it is possible, if appropriate in addition to the variant described above, to provide separate gutter-like collection means which extend beneath in each case one bearing arm. In this way, the moisture which drips off the bearing arms themselves can also be collected.

The gutter-like collection means in this case comprise separate gutter profiled sections which extend beyond the outermost circumference of the turns. The gutters preferably run on a slope towards the outside of the turns and, in the vicinity of this outer side, are connected to a drainage pipe.

With a view to cleaning the oven, it is possible for an inlet nozzle for a cleaning liquid to be provided in the vicinity of the innermost circumference of the turns, for the purpose of rinsing the gutter-like collection means. The cleaning liquid can be discharged and collected via the discharge pipe.

According to a second possible option, a passage for supplying cleaning liquid to the inlet nozzle extends through the bearing means.

According to a further possible embodiment, the collection means are in plate form. In particular, the plate-like collection means may extend so as to follow the turns.

The invention will now be explained in more detail with reference to a number of exemplary embodiments which are illustrated in the figures.

Figure 1:
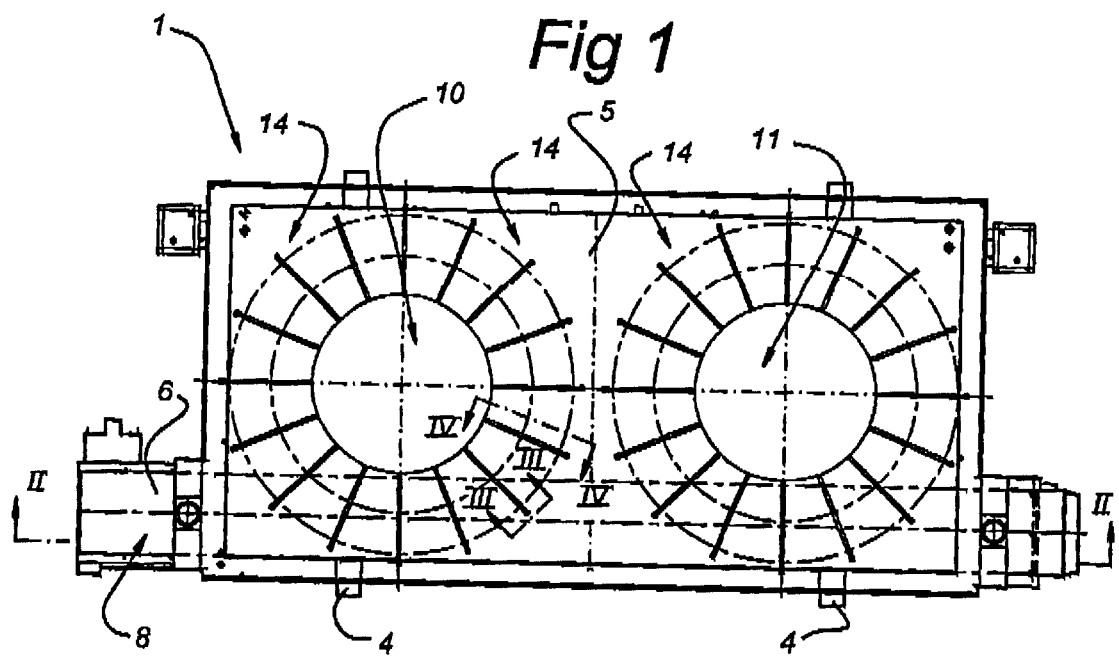
FIG. 1 shows a plan view, in accordance with section I—I from FIG. 2, of the oven according to the invention.
Figure 2:
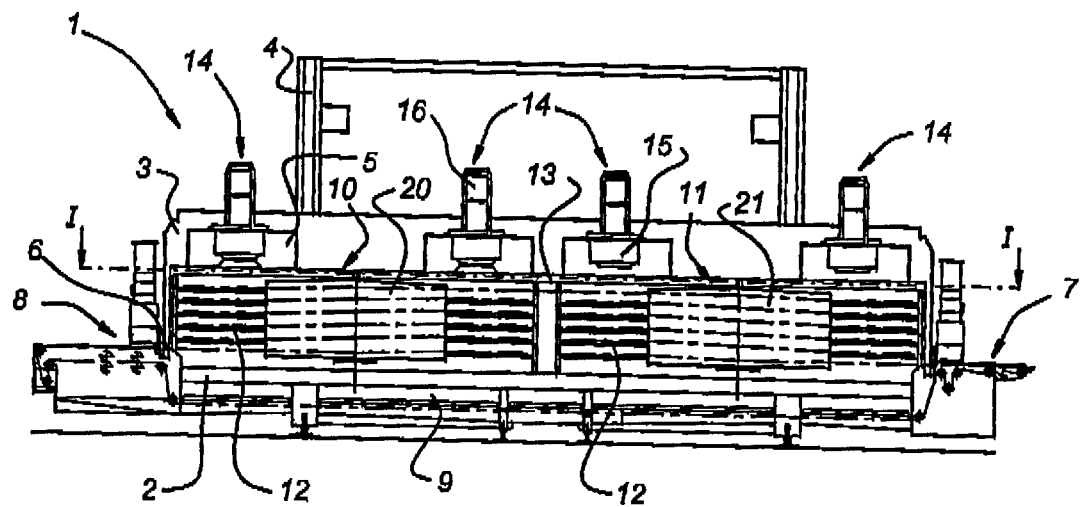
FIG. 2 shows a side view of section II—II indicated in FIG. 1.

The oven according to the invention which is illustrated in FIGS. 1 and 2 comprises a housing 1 which, in a known way, comprises a receptacle 2 and a cap 3 which can move up and down with respect to the receptacle. This cap 3 is connected to the lifting means which are located on the legs 4. In the embodiment shown in FIG. 2, the cap 3 is illustrated in the closed state, with the interior space 5 of the oven being closed off with respect to the environment, with the exception of an inlet opening 6 and an outlet opening 7.

The conveyor belt 8 is guided to the outside via this inlet opening 6 and outlet opening 7. That part 9 of the conveyor belt which is located outside the oven runs from the outlet 7 to the inlet 6, passing through the usual tensioning means and cleaning means.

In the interior space 5, the belt follows two helical paths 10, 11, each with turns 12 located above one another.

In the embodiment illustrated, both helical paths 10, 11 are located in one large space; as an alternative, however, the oven may also be divided into two spaces, which each comprise a helical path 10 or 11. In that case, the high part 13 of the belt is guided through an opening in a partition (not shown).

The hot-air heating means, which are denoted overall by 14, are illustrated in the top of the cap. These hot-air heating means are known per se; they comprise a fan 15 and an electrical motor 16 for driving the fan. Hot air at the desired temperature can be circulated through the interior space of the housing by means of these hot-air heating means. The hot air passes over the products which are to be heated and are located on the belt 8 in the helical paths 10, 11.

The helical paths are guided in a known way by means of helical guides 17 which extend so as to follow these turns. These helical guides 17 are formed in a customary way by plastic strips, of which, as shown in the view shown in FIG. 4, in this exemplary embodiment in each case three such strips 17 support the belt 8. Naturally, it is also possible to use other numbers of strips, depending on the width of the strip.

The plastic strips 17 are in turn each supported by bearing means 18, which at their outermost ends are mounted on uprights 19. At their innermost end, they extend in cantilevered fashion to close to the drum 20 or 21 against which the helical paths 10, 11 rest in such a manner as to be driven.

The driving of the drums 20, 21 is known per se and comprises, in the customary way, a drive shaft which is in each case connected to the drum 20, 21. These drive shafts are connected to one another by, for example, a chain transmission and are set in motion by an electric motor (not shown).

While the oven is operating, the heating of the products leads to the release of gases and vapours, while drops of fat and the like may also leak out of the products. These gases and liquids may, under the influence of the flow of air, be deposited on various parts in the interior space 5 of the oven. In particular, it has been found that liquids and gases of this type may give rise to deposits on the bearing means 18. As a result, drops are formed at certain points, which drops, as a result of the prolonged heating in the oven, may burn and form carbonized residues. The liquids adhering to the bearing means 18 then run further downwards along these icicle shapes and cause further growth. Other parts of the liquid drop off at the bottom of the icicle shapes, carrying with them the carbon which has been formed at that location, and pass onto the products located on the lower turns 12. These carbon-containing drops cause spots to form on the products, which is unacceptable.

Figure 4:
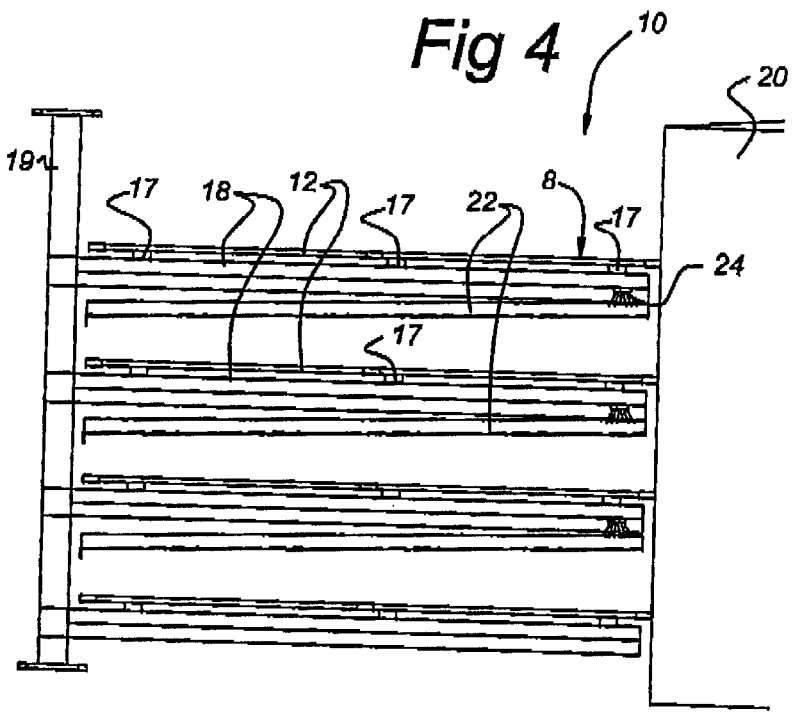
FIG. 4 shows part of the view, partially in section, of IV—IV in FIG. 1, for a first variant of the collection means according to the invention.

Therefore, according to the invention, in a first possible embodiment, collection gutters 22 are arranged beneath each bearing means 18. FIG. 4 shows that these collection gutters 22 run at a slight slope from the associated drum 20 to outside the turns 12.

Figure 3:
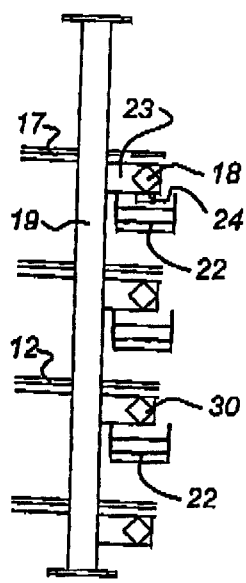
FIG. 3 shows part of the view III—III from FIG. 1.

FIG. 3 shows that the collection gutters 22 are wide enough to collect the drops originating from the bearing means 18. These bearing means 18 are secured to the uprights 19 by means of mounting plates 23. The guides 17 are also illustrated in FIG. 3. The turns 12 of the conveyor belt have been omitted in FIG. 3.

A drainage pipe (not shown) may be arranged at the outermost end of the collection gutters 22 with a view to draining away the collected drops, but also with a view to draining away a cleaning liquid. This cleaning liquid may be applied by means of inlet nozzles 24, which are located in the vicinity of the innermost end of the drainage gutters 22. These inlet nozzles 24 are secured to the bearing means 18 and are supplied by an inlet passage (not shown) which extends through the bearing means 18. Moreover, the inlet nozzles 24 may also be located further towards the outside of the drainage gutters 22 and may also be supplied by separate passages, i.e. outside the bearing means 18.

Figure 5:
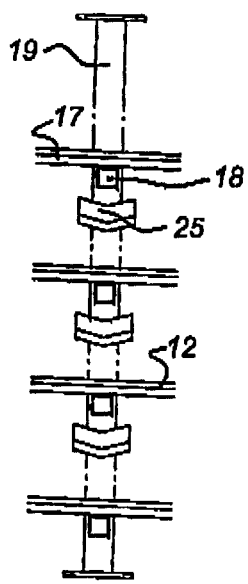
FIGS. 5 and 6 show a second variant of the collection means according to the invention.
Figure 6:
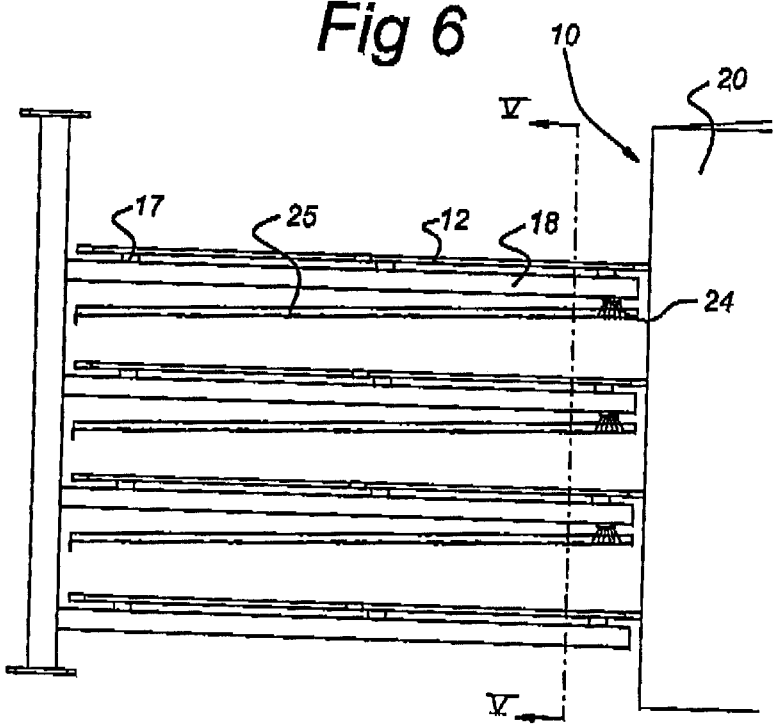

The variant illustrated in FIGS. 5 and 6 shows a different type of drainage gutter 25, which is located beneath the bearing means 18. In the variant shown in FIGS. 5 and 6, the bearing means 18 are fixed directly to the upright 19. The collection gutters 25 in the variant shown in FIGS. 5 and 6 are V-shaped in cross section; the collection gutters 22 according to the embodiment shown in FIGS. 3 and 4 are in the form of open box sections.

Figure 7:
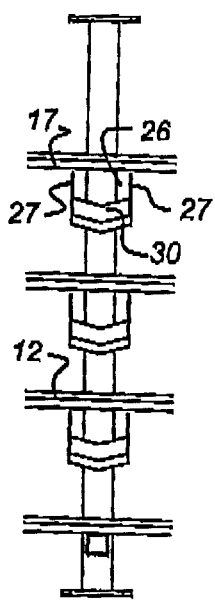
FIGS. 7 and 8 show a third variant of the collection means according to the invention.
Figure 8:
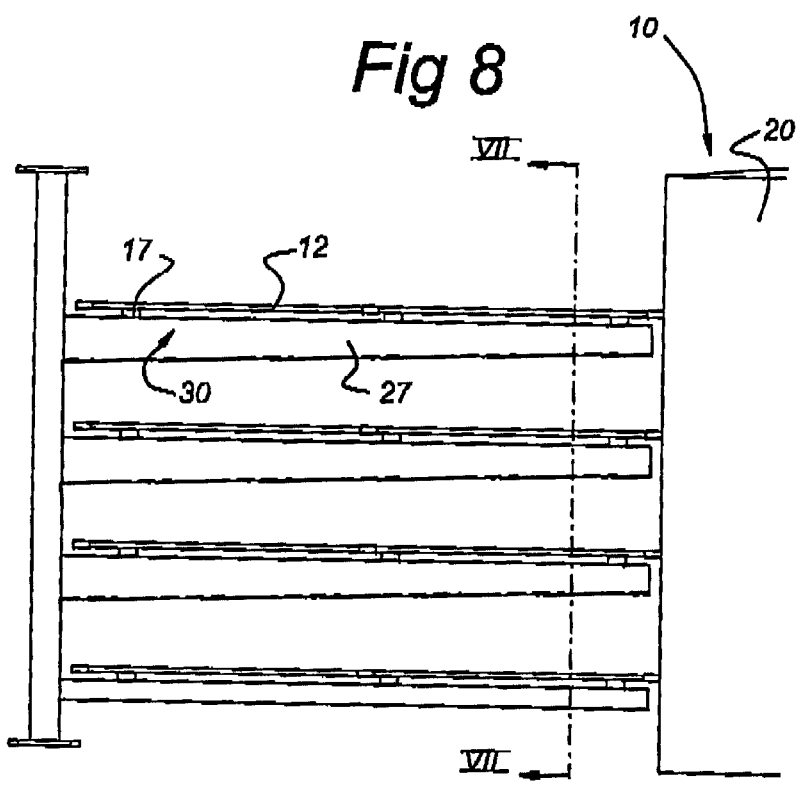

The variant illustrated in FIGS. 7 and 8 shows that the collection gutters may also be formed by a concave upper side 26 of the bearing means 30. These bearing means 30 have upright walls 27 on which the guides 17 are supported.

Any fat which drips off the guides 17 and the turns 12 can be collected in the gutter-shaped upper side 26 of the bearing means 30. With these bearing means 30 it is likewise possible to provide inlet nozzles 24 for a cleaning liquid; the feed passage may be provided inside or outside the bearing means 12.

Figure 9:
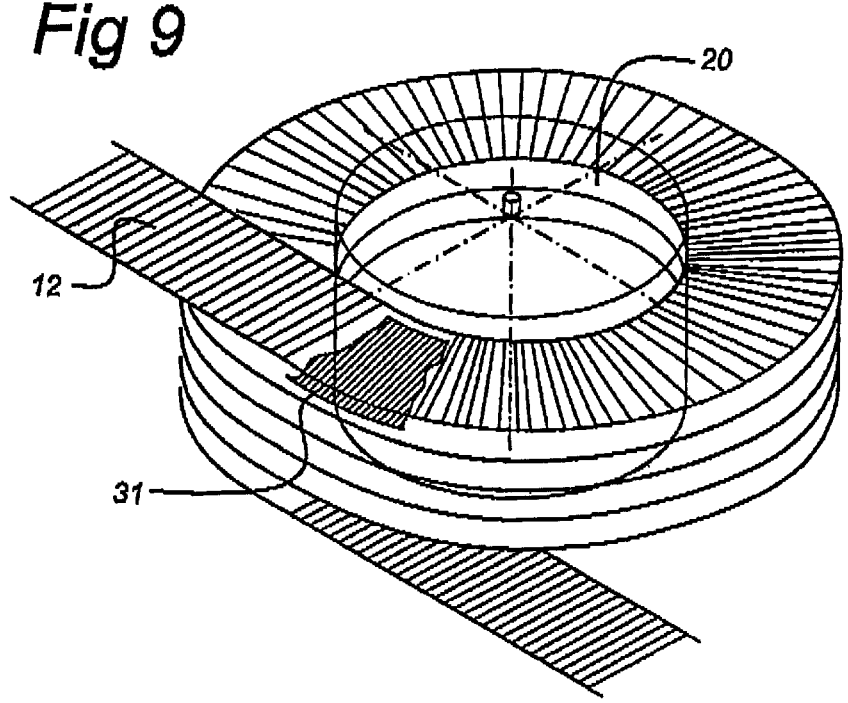
FIG. 9 shows a fourth variant of the collection means according to the invention.

In the variant shown in FIG. 9, there is a continuous plate 31 which extends helically below the conveyor belt 12. If appropriate, this plate 31 may run on a slope, radially outwards, with respect to the drum 10, in order to collect fat, moisture, cleaning liquid and the like at the outer edge thereof. For this purpose, it is possible, for example, to provide a gutter (not shown) on the outer side of the plate 31.

What is claimed is:

1. An oven comprising:
   a housing,
   heating means for heating an interior space of the housing,
   a conveyor belt which extends between an inlet and an outlet of the housing, for passing products which are to be heated through the interior space, which conveyor belt has at least one helical path with turns which are situated above one another and are supported by means of guides, which extend in a corresponding way to the turns and are supported by bearing arms transversely below the turns, and
   collection means for the collection of liquids, wherein the collection means has an elongated shape and extends in a direction transverse with respect to the turns for the collection of liquids which may accumulate on at least one of the bearing arms and guides.

2. Oven according to claim 1, wherein the collection means extends radially.

3. Oven according to claim 1, wherein the collection means includes at least one gutter.

4. Oven according to claim 3, wherein the gutter is formed in the bearing arms.

5. Oven according to claim 3, wherein the gutter extends below the bearing arms.

6. Oven according to claim 5, wherein the gutter includes separate gutter profiled sections which extend beyond the outermost circumference of the turns.

7. Oven according to claim 3, wherein an inlet nozzle for a cleaning liquid is provided in the vicinity of the innermost circumference of the turns, for rinsing the gutter.

8. Oven according to claim 7, wherein the gutter runs on a slope for the purpose of discharging fat and the cleaning liquid.

9. Oven according to claim 7, wherein a passage for supplying cleaning liquid to the inlet nozzle extends through the bearing means.

10. Oven according to claim 1, wherein the collection means includes a plate.

11. Oven according to claim 10, wherein the plate extends so as to follow the turns.

12. Oven according to claim 11, in which the plate is formed by a helical plate.

13. Oven according to claim 10, wherein the plate runs radially outwards, on a slope, with respect to the associated drum.

\* \* \* \* \*